(12) United States Patent
Abe et al.

(10) Patent No.: US 8,035,066 B2
(45) Date of Patent: Oct. 11, 2011

(54) SOLID-STATE IMAGING DEVICE INCLUDING A/D CONVERTING CIRCUIT WITH POWER-DOWN CONTROLLER

(75) Inventors: Yutaka Abe, Osaka (JP); Kazuko Nishimura, Kyoto (JP); Hiroshi Kimura, Hyogo (JP)

(73) Assignee: Panasonic Corporation, Osaka (JP)

( * ) Notice: Subject to any disclaimer, the term of this patent is extended or adjusted under 35 U.S.C. 154(b) by 464 days.

(21) Appl. No.: 12/212,328

(22) Filed: Sep. 17, 2008

(65) Prior Publication Data

US 2009/0166513 A1 Jul. 2, 2009

(30) Foreign Application Priority Data

Dec. 26, 2007 (JP) ................................. 2007-334715

(51) Int. Cl.
*H01L 27/00* (2006.01)
(52) U.S. Cl. ........... 250/208.1; 250/214.1; 250/214 DC; 341/155; 341/156
(58) Field of Classification Search .................. 250/216, 250/214.1, 214 R, 214 DC, 208.1, 208.2; 341/155, 156
See application file for complete search history.

(56) References Cited

U.S. PATENT DOCUMENTS

| | | | |
|---|---|---|---|
| 5,914,681 A | 6/1999 | Rundel | |
| 6,498,576 B1 | 12/2002 | Tian et al. | |
| 7,088,279 B2 | 8/2006 | Muramatsu et al. | |
| 2004/0246030 A1* | 12/2004 | Yang | 327/58 |
| 2005/0231624 A1 | 10/2005 | Muramatsu et al. | |
| 2007/0030187 A1* | 2/2007 | Muramatsu et al. | 341/118 |
| 2008/0011937 A1 | 1/2008 | Toshikiyo | |
| 2008/0129851 A1 | 6/2008 | Kasuga et al. | |
| 2008/0259193 A1 | 10/2008 | Toya et al. | |
| 2008/0266159 A1 | 10/2008 | Murata et al. | |

FOREIGN PATENT DOCUMENTS

JP 2005-303648 10/2005

OTHER PUBLICATIONS

Japanese language Abstract of JP 2005-303648, Oct. 27, 2005.
U.S. Appl. No. 12/235,839 to Kato et al., which was filed on Sep. 23, 2008.

* cited by examiner

*Primary Examiner* — Francis M Legasse, Jr.
(74) *Attorney, Agent, or Firm* — Greenblum & Bernstein, P.L.C.

(57) ABSTRACT

A solid-state imaging device includes pixels, arranged in a matrix, each of which converts light into a signal voltage. The solid-state imaging device also includes column signal lines, each of which is provided for corresponding one of columns, so that the signal voltage is provided to corresponding one of the column signal lines. Additionally, the solid-state imaging device includes AD converting units, each of which is provided for the corresponding one of the column signal lines, and is configured to convert the signal voltage into a digital signal. Each of the AD converting units includes a comparing unit generating an output signal indicating a greater voltage of the signal voltage and a reference voltage, and a counting unit counting a count value until logic of the output signal is inverted The solid-state imaging device further includes a suspending unit suspending power supply to the comparing units after the logic of the output signals is inverted.

9 Claims, 12 Drawing Sheets

SOLID-STATE IMAGING DEVICE INCLUDING A/D CONVERTING CIRCUIT WITH POWER-DOWN CONTROLLER

BACKGROUND OF THE INVENTION (1) Field of the Invention

The present invention relates to solid-state imaging devices, and more particularly, to a solid-state imaging device including an AD converting circuit for each of columns.

(2) Description of the Related Art

Solid-state imaging devices, converting light into electric signals, are utilized in various electric appliances, such as digital video cameras, digital still cameras, and fax machines. CCD (Charge Coupled Device) image sensors and CMOS (Complementary Metal-Oxide Semiconductor) image sensors are well known as solid-state imaging devices.

A CMOS image sensor AD-converts an electric signal read from pixels arranged in a matrix, and outputs the converted electric signal, a resulting digital signal, out of the sensor.

As a conventional CMOS image sensor, there is a solid-state imaging device including an AD converting circuit for each of columns and outputting an AD converted digital signal on a line-to-line basis (See Japanese Unexamined Patent Application Publication No. 2005-303648).

A conventional solid-state imaging device, including an AD converting circuit for each of columns, shall be described hereinafter.

FIG. 1 is a block diagram exemplifying a structure of the conventional solid-state imaging device. A conventional solid-state imaging device 500 in FIG. 1 includes a pixel array 501, a column scanning unit 502, an AD converting unit 503, a reference voltage generating unit 504, a row scanning unit 505, an output unit 506, and a timing controlling unit 507.

The pixel array 501 includes pixels 508 arranged in a matrix. Each of the pixels 508 converts received light into a signal voltage, and provides the converted signal voltage to a column signal line provided on each of columns.

The column scanning unit 502 sequentially selects lines of the pixels 508.

The AD converting unit 503 dynamically converts each of signal voltages provided to associated column signal lines into a digital signal. The AD converting unit 503 includes an AD converting circuit on each column, and each of AD converting circuits includes a comparator 509, and a counter 511.

Each comparator 509 compares the signal voltage provided to the column signal line and a reference voltage RAMP, and then outputs an output signal showing the greater voltage, either the signal voltage or the reference voltage RAMP.

Using a clock ADCLK, the counter 511 counts a count value. The counter 511 suspends the counting, upon the output signal outputted from the comparator 509 inverting.

The reference voltage generating unit 504 generates the reference voltage RAMP.

The row scanning unit 505 sequentially selects columns of the associated pixels 508.

The output unit 506 outputs the digital signals converted by the AD converting unit 503 out of the conventional solid-state imaging device 500.

The timing controlling unit 507 controls operational timing of the column scanning unit 502, the AD converting unit 503, the reference voltage generating unit 504, and the row scanning unit 505.

The above structure allows the conventional solid-state imaging device 500 to AD-convert the signal voltages generated the pixels 508 on a line-to-line basis, and then to outputs the AD-converted signal voltages; namely digital signals.

The solid-state imaging device 500, however, includes as many AD converting circuits as the number of columns of the pixel 508. Thus, unfortunately, a consumption current of the AD converting unit 503 is large. Specifically, a bias current of the comparator 509 on each column is approximately 10 µA. Having approximately 2500 columns, the consumption current of the AD converting unit 503 is 25 mA. This increases the power consumption of the conventional solid-state imaging device 500. Moreover, in the case where the number of the pixels increases in the future, the power consumption of the AD converting unit 503 increases further.

In addition, a typical digital still camera and a digital video camera are battery-powered. Hence, in order to realize long recording time on digital still cameras and digital video cameras, solid-state imaging devices in the digital still cameras and the digital video cameras are desired to consume small amount of electricity.

SUMMARY OF THE INVENTION

The present invention is conceived in view of the above problems and has as an objective to provide a solid-state imaging device reducing power consumption.

In order to solve the above problems, a solid-state imaging device in the present invention includes: pixels, arranged in a matrix, each of which converts light into a signal voltage; column signal lines each of which is provided for corresponding one of columns on which the pixels are arranged, so that the signal voltage generated by the pixel is provided to corresponding one of the column signal lines; and AD converting units each of which is provided for the corresponding one of the column signal lines, and configured to convert the signal voltage into a digital signal, wherein each of the AD converting units includes: a comparing unit configured to generate an output signal indicating a greater voltage of the signal voltage and a reference voltage; and a counting unit configured to count a count value to measure an elapsed time until logic of the output signal is inverted, and the solid-state imaging device further includes a suspending unit configured to suspend power supply to the comparing units after the logic of the output signals is inverted. According to this structure, the solid-state imaging device of the present invention can reduce power consumption by suspending power supply to the comparing unit. Here, in the solid-state imaging device, different kinds of supply power voltage are used for an analogue circuit and a digital circuit. The supply power voltage used for the analogue circuit is greater than the supply power voltage used for the digital circuit. Thus, the reduction of the power consumption of the comparing unit; namely the analogue circuit, significantly contributes to reduction of power consumption of the entire solid-state imaging device.

In addition, the suspending unit may simultaneously suspend the power supply to all of the comparing units after elapse of the predetermined time since the counting unit starts the counting.

According to this structure, power supply to all the comparing units is simultaneously suspended, which contributes reduction of power consumption of the solid-state imaging device. Further, comparing with sequential suspension of power supply to each of the comparing units during an AD converting operation, the simultaneous power suspension reduces a fluctuation of power supply voltage and ground potential. This allows the solid-state imaging device of the present invention to reduce deterioration of picture quality.

Moreover, the suspending unit may suspend the power supply to each of the comparing units upon inversion of the logic of the output signal generated by the comparing unit.

According to this structure, the solid-state imaging device of the present invention sequentially suspends power supply to the comparing units in a column of which AD conversion operation has completed. This allows the solid-state imaging device of the present invention to reduce power consumption.

Further, the suspending unit may include flip-flops which are provided for each of the corresponding AD converting units, and each of which has a clock input terminal and a data input terminal, the clock input terminal receiving the output signal generated by the comparing unit, and the data input terminal receiving a signal having predetermined logic, and the suspending unit may suspend the power supply to each of the comparing units upon inversion of logic of a signal provided to a data output terminal of the each of flip-flops, and the counting unit may count a time for the logic of the signal to invert, the signal being provided to the data output terminal of the each of flip-flops.

This allows the solid-state imaging device of the present invention to avoid a metastable effect occurring when the output signal of the comparing unit changes.

In addition, the suspending unit may include transistors which are provided for each of the corresponding AD converting units, and each of the transistors may fix the output signal, generated by the comparing unit, to logic shown as a result of the inversion of the logic of the output signal.

Moreover, the suspending unit may further include inverting units which are provided for each of the corresponding AD converting units, and each of the inverting units may invert the logic of the output signal generated by the comparing unit, and each of the transistors may receive: the signal of which logic is inverted by the inverting unit into a gate; a signal having logic as the result of inverting the logic of the output signal into a source, and a drain in the transistor may be connected to an output terminal of the comparing unit.

This structure allows circuit area of the solid-state imaging device of the present invention to be reduced, compared with a structure including a flip-flop.

Further, the suspending unit may include a switching unit switching between a first suspending operation and a second suspending operation, the first suspending operation suspending the power supply to each of the comparing units upon the inversion of the logic of the output signal generated by the comparing unit is inverted, and the second suspending operation simultaneously suspending the power supply to all of the comparing units after the predetermined time elapses since the counting unit starts counting.

According to this structure, the solid-state imaging device of the present invention can switch between an operation mode having priority on low power consumption and an operation mode having priority on high picture quality.

Moreover, the present invention includes a controlling method for a solid-state imaging device which has: pixels, arranged in a matrix, each of which converts light into a signal voltage; column signal lines each of which is provided for corresponding one of columns on which the pixels are arranged, so that the signal voltage generated by the pixel is provided to corresponding one of the column signal lines; and AD converting units each of which is provided for the corresponding one of the column signal lines, and configured to convert the signal voltage into a digital signal, wherein each of the AD converting units includes: a comparing unit configured to generate an output signal indicating a greater voltage of the signal voltage and a reference voltage; and a counting unit configured to count a count value to measure an elapsed time until logic of the output signal is inverted, and the controlling method comprises suspending power supply to the comparing units after the logic of the output signals is inverted.

This allows the solid-state imaging device of the present invention to reduce power consumption by suspending power supply to the comparing unit. It is noted that the present invention can be implemented as: a controlling method of a solid-state imaging device having characteristic units included in the solid-state imaging device as steps; and a program which causes a computer to execute the characteristic steps, as well as the solid-state imaging device as described above. As a matter of course, the program can be distributed thorough a recording medium, such as a CD-ROM, and a transmission medium, such as the Internet.

As described above, the present invention can provide a solid-state imaging device which can reduce power consumption.

Further Information about Technical Background to this Application

The disclosure of Japanese Patent Application No. 2007-334715 filed on Dec. 26, 2007 including specification, drawings and claims is incorporated herein by reference in its entirety.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Figure 1:
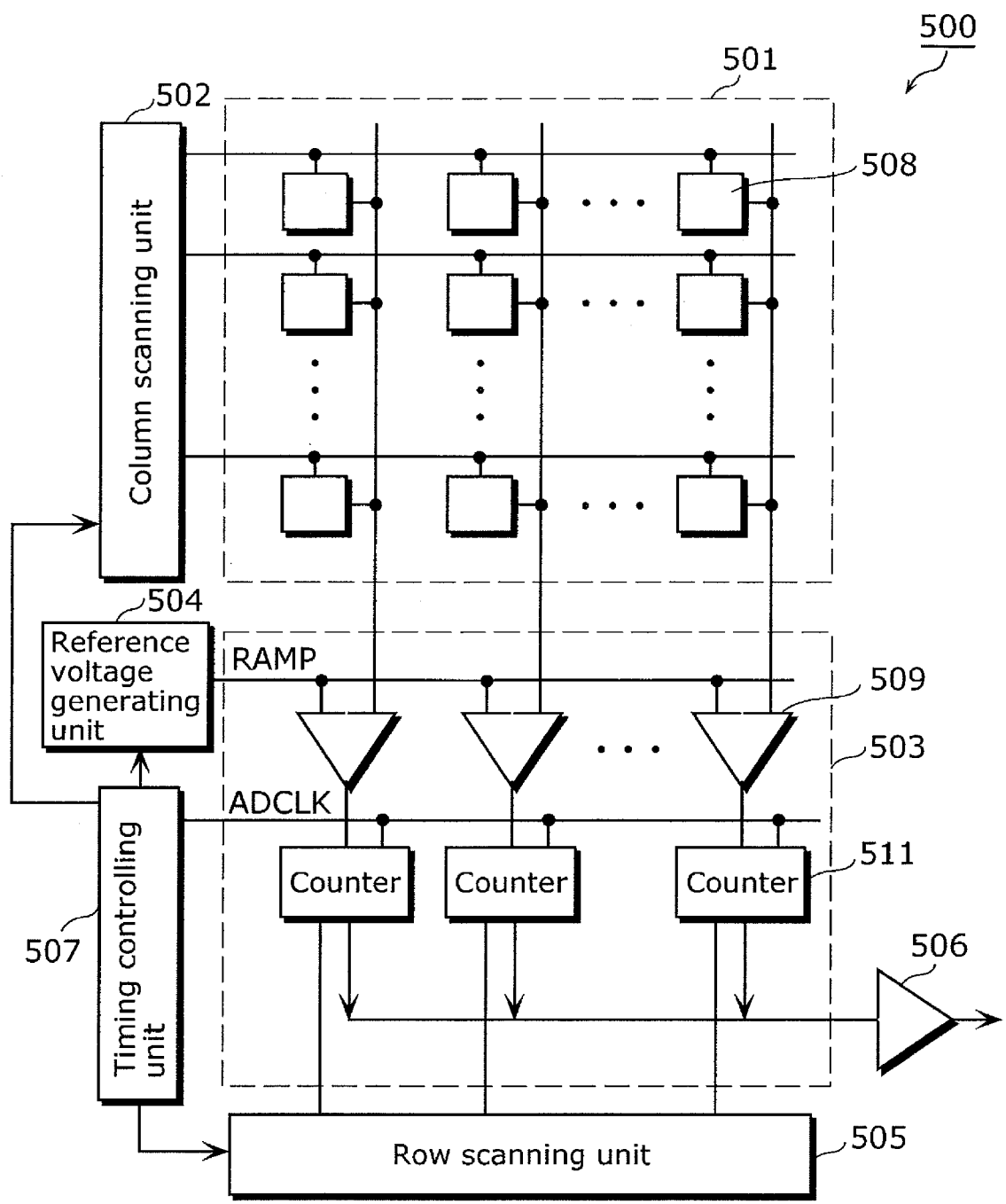
FIG. 1 is a block diagram showing a structure of a conventional solid-state imaging device.

Embodiments of a solid-state imaging device in the present invention shall be described in detail, referring to the drawings, hereinafter.

First Embodiment

A solid-state imaging device in a first embodiment of the present invention sequentially causes comparators of AD converting circuits, of which AD conversion has completed, to go into a suspension state. This allows the solid-state imaging device in the first embodiment of the present invention to reduce power consumption.

First, the solid-state imaging device in the first embodiment of the present invention shall be described.

Figure 2:
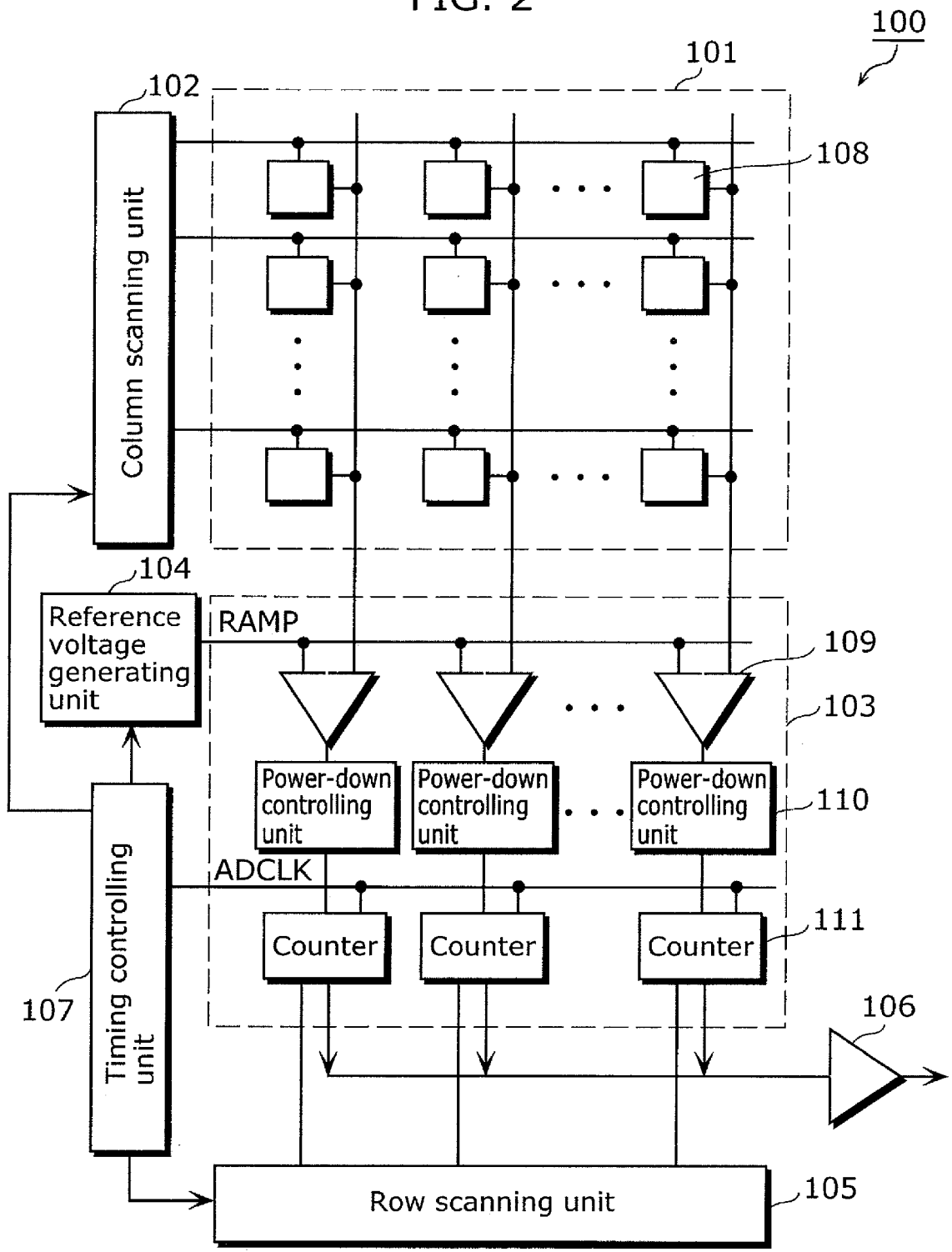
FIG. 2 is a block diagram showing a structure of a solid-state imaging device in a first embodiment of the present invention.

FIG. 2 is a block diagram showing a structure of a solid-state imaging device 100 in the first embodiment of the present invention.

The solid-state imaging device 100 in FIG. 2 is a CMOS image sensor, and includes a pixel array 101, a column scanning unit 102, an AD converting unit 103, a reference voltage generating unit 104, a row scanning unit 105, an output unit 106, and a timing controlling unit 107.

The pixel array 101 includes pixels 108 arranged in a matrix. Each of the pixels 108 converts received light into a signal voltage, and forwards the converted signal voltage to a column signal line provided to each of columns.

The column scanning unit 102 performs column scanning sequentially selecting lines of associated pixels 108. AD conversion unit 103 simultaneously converts signal voltages provided to the column signal lines into digital signals.

The reference voltage generating unit 104 generates a reference voltage RAMP.

The row scanning unit 105 performs row scanning sequentially selecting columns of associated pixels 108.

The output unit 106 outputs the digital signals converted by the AD conversion unit 103 out of the solid-state imaging device 100.

The timing controlling unit 107 controls operational timing of the column scanning unit 102, the AD conversion unit 103, the reference voltage generating unit 104, and the row scanning unit 105.

Figure 3:
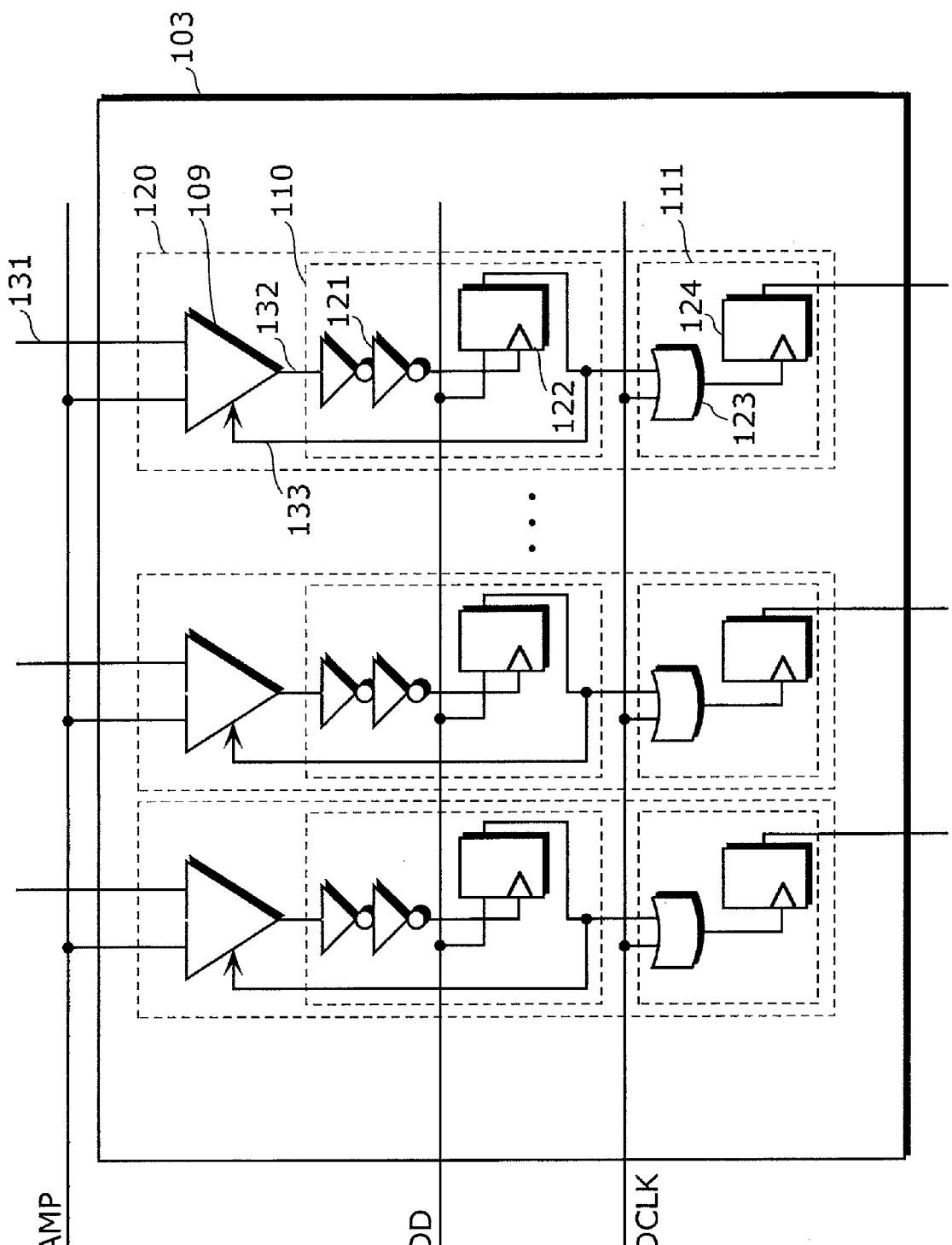
FIG. 3 shows a structure of an AD converting unit in the first embodiment of the present invention.

FIG. 3 shows a structure of the AD converting unit 103.

AD converting unit 103 includes AD converting circuits 120 each of which is provided on an associated column signal line. Each of the AD conversion unit 120 converts a signal voltage 131, provided to the associated column signal line, into a digital signal. The AD converting circuit 120 includes a comparator 109, a power-down controlling unit 110 and a counter 111.

The comparator 109 compares the signal voltage 131 provided to the column signal line with the reference voltage RAMP, and then outputs an output signal 132 showing the greater voltage, either the signal voltage or the reference voltage RAMP. Specifically, the comparator 109 outputs: a low-level output signal 132 in the case where the signal voltage 131 is greater than the reference voltage RAMP; and a high-level output signal 132 in the case where the signal voltage 131 is smaller than the reference voltage RAMP.

The power-down controlling unit 110 turns a power-down signal 133 into low-level upon logic of the output signal 132 inverting from low-level to the high-level. The power-down signal 133 is inputted into the comparator 109. When the power-down signal 133 is in the high-level, the comparator 109 is in an operation state. When the power-down signal 133 is in low-level, the comparator 109 is in a suspension state (power-down state). In other words, the power-down controlling unit 110 suspends power supply to the comparator 109 upon logic of the output signal 132 inverting from low-level to the high-level. Specifically, the power-down controlling unit 110 suspends supplying driving current to the comparator 109.

The power-down controlling unit 110 includes a buffer 121 and a flip-flop 122.

The buffer 121 converts the output signal 132, having amplitude of analogue circuit-based power supply voltage (3.3V, for example), into a signal having amplitude of digital circuit-based power supply voltage (1.2V, for example), and then inputs the signal into a clock input terminal of the flip-flop 122. It is noted that the analogue circuit-based power supply voltage is supplied to the comparator 109, and the digital circuit-based power supply voltage is supplied to the flip-flop 122 and the counter 111.

An output terminal of the buffer 121 is connected to the clock input terminal of the flip-flop 122, and power supply voltage VDD is connected to a data input terminal of the flip-flop 122. The flip-flop 122 outputs the power-down signal 133 to an inverted data output terminal.

Using a clock ADCLK, the counter 111 counts a count value. The counter 111 counts the count value until the output signal 132 outputted from the comparator 109 inverts, so that a time is counted until the logic of the output signal 132 inverts. In other words, the counter 111 suspends the counting upon the output signal 132 reversing.

The counter 111 includes an OR circuit 123 and a counter circuit 124. To two input terminals of the OR circuit 123, the clock ADCLK and the power-down signal 133 are connected, respectively. An output terminal of the OR circuit 123 is connected to a clock input terminal of the counter circuit 124.

Figure 4:
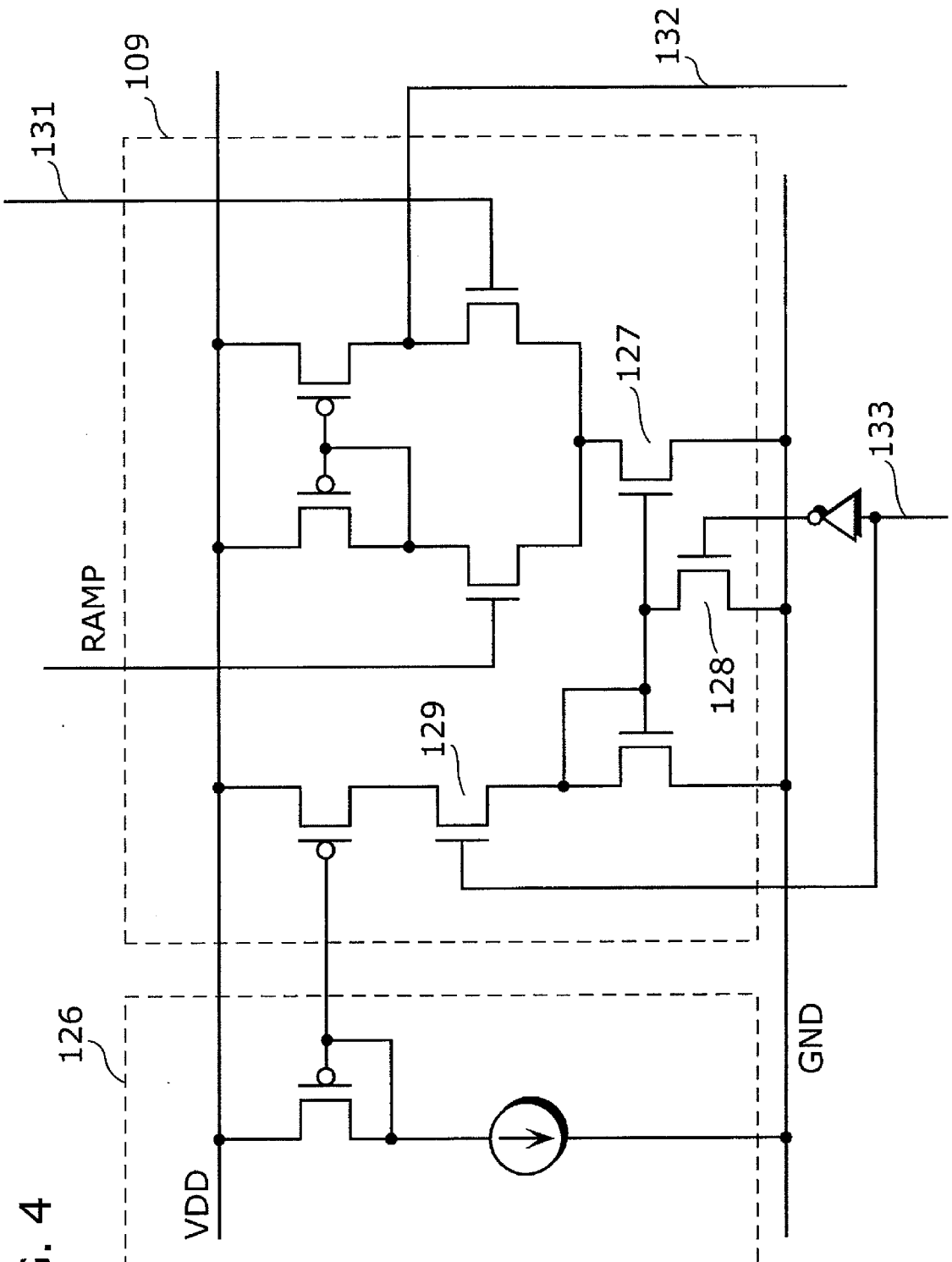
FIG. 4 shows a structure of a comparator in the first embodiment of the present invention.

FIG. 4 is a circuit diagram exemplifying a structure of the comparator 109.

When the power-down signal 133 is in the low-level, a transistor 128 turns on and a transistor 129 turns off. This turns a transistor 127 off. Hence, the driving current is not supplied to the comparator 109, so that the comparator 109 goes into a suspension state.

Further, the comparators 109 are connected to one driving current supplying circuit 126 supplying driving current to the comparators 109.

It is noted that the structure of the comparator 109 is not limited to the structure shown in FIG. 4, and may be structured to include a similar structure. For example, the transistor 129 is connected in series to a drain side of a p-type transistor structuring a current mirror with the driving current supplying circuit 126; meanwhile, the transistor may be connected in series to a source side.

Next, an operation of the solid-state imaging device 100 in the first embodiment of the present invention shall be described.

Figure 5:
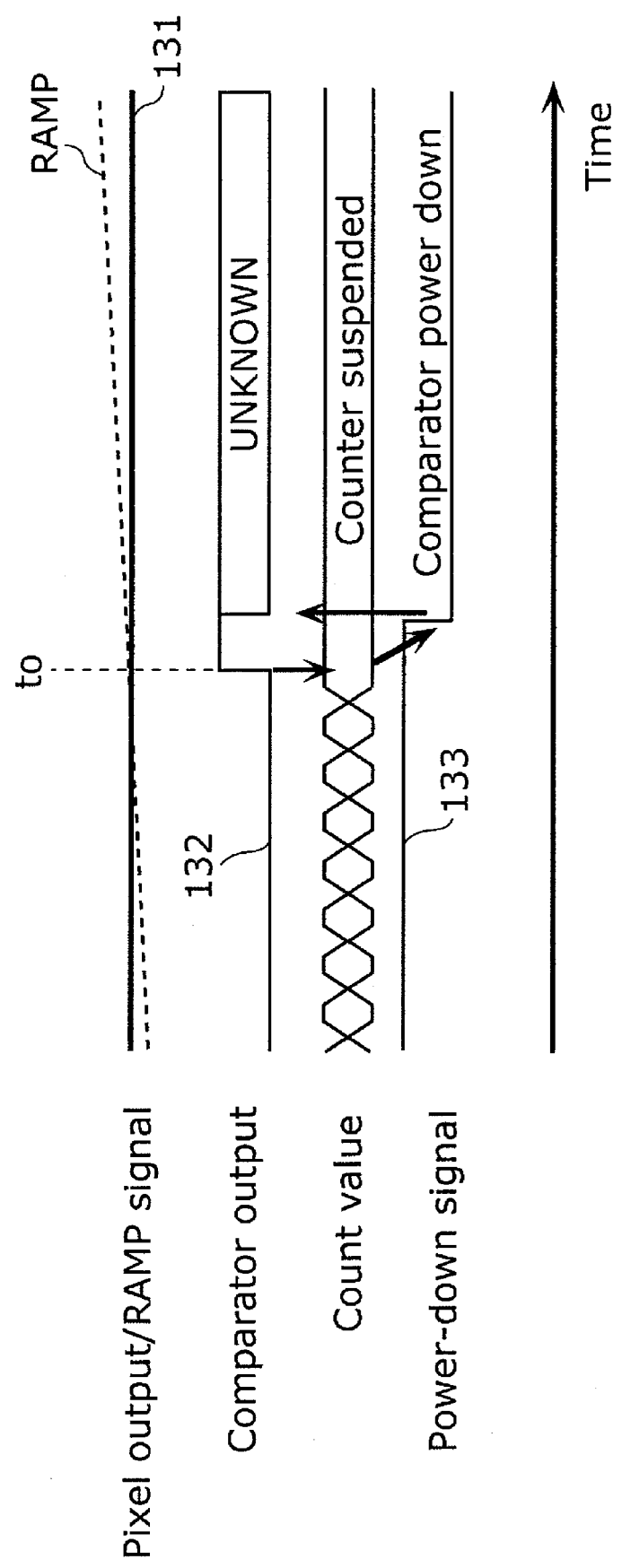
FIG. 5 shows an operation of the AD converting unit in the first embodiment of the present invention.

FIG. 5 shows AD converting operations on the AD converting unit 103.

First, when an AD converting process starts, the flip-flop 122 and the counter circuit 124 are reset. In addition, the clock ADCLK is supplied to the AD converting unit 103. The reset causes the flip-flop 122 to generate the high-level power-down signal 133.

Since the power-down signal 133 is in the high-level, the comparator 109 is in the operation state. Further, the reference voltage (lamp signal) RAMP is smaller than the signal voltage 131 before a time t0. Thus, the comparator 109 outputs the low-level output signal 132.

Further, the power-down signal 133 is in the high-level, the clock ADCLK is supplied to the counter circuit 124. This causes the counter circuit 124 to count the count value.

At the time t0, the signal voltage 131 and the reference voltage RAMP meet each other. This changes the output signal 132 of the comparator 109 from the low-level to the high-level.

From a rising edge of the output signal 132, the flip-flop 122 holds the high-level. After rising of the edge, the flip-flop 122 generates the low-level-power-down signal 133.

Since the power-down signal 133 is in the low-level, the clock ADCLK is not supplied to the counter circuit 124. This causes the counter circuit 124 to hold the count value as of the time t0.

Further, since the power-down signal 133 is in the low-level, the comparator 109 goes into the suspension state. In the suspension state, the comparator 109 outputs either the high-level or the low-level output signal 132.

Here, the signal voltage 131 to be provided to the associated column signal line differs depending on an amount of incident light (luminance) into the pixels 108. Thus, each of the comparators 109 goes into the suspension state at a different timing.

As described above, the AD converting unit 103 in the first embodiment of the present invention sequentially causes the AD converting circuits 120, of which AD conversion has completed, to go into the suspension state. This reduces the consumption current of the AD converting unit 103. Thus, the solid-state imaging device 100 in the first embodiment of the present invention can reduce power consumption. Assuming that an average time required for the AD conversion process for each column is approximately half as long as a time required for the longest AD conversion process, the AD converting unit 103 in the first embodiment of the present invention can cut power consumption in half, compared to the conventional AD conversion unit 503.

Further, since including the flip-flop 122, the AD converting unit 103 can avoid a metastable effect occurring when the output signal 132 of the comparator 109 changes.

Figure 6:
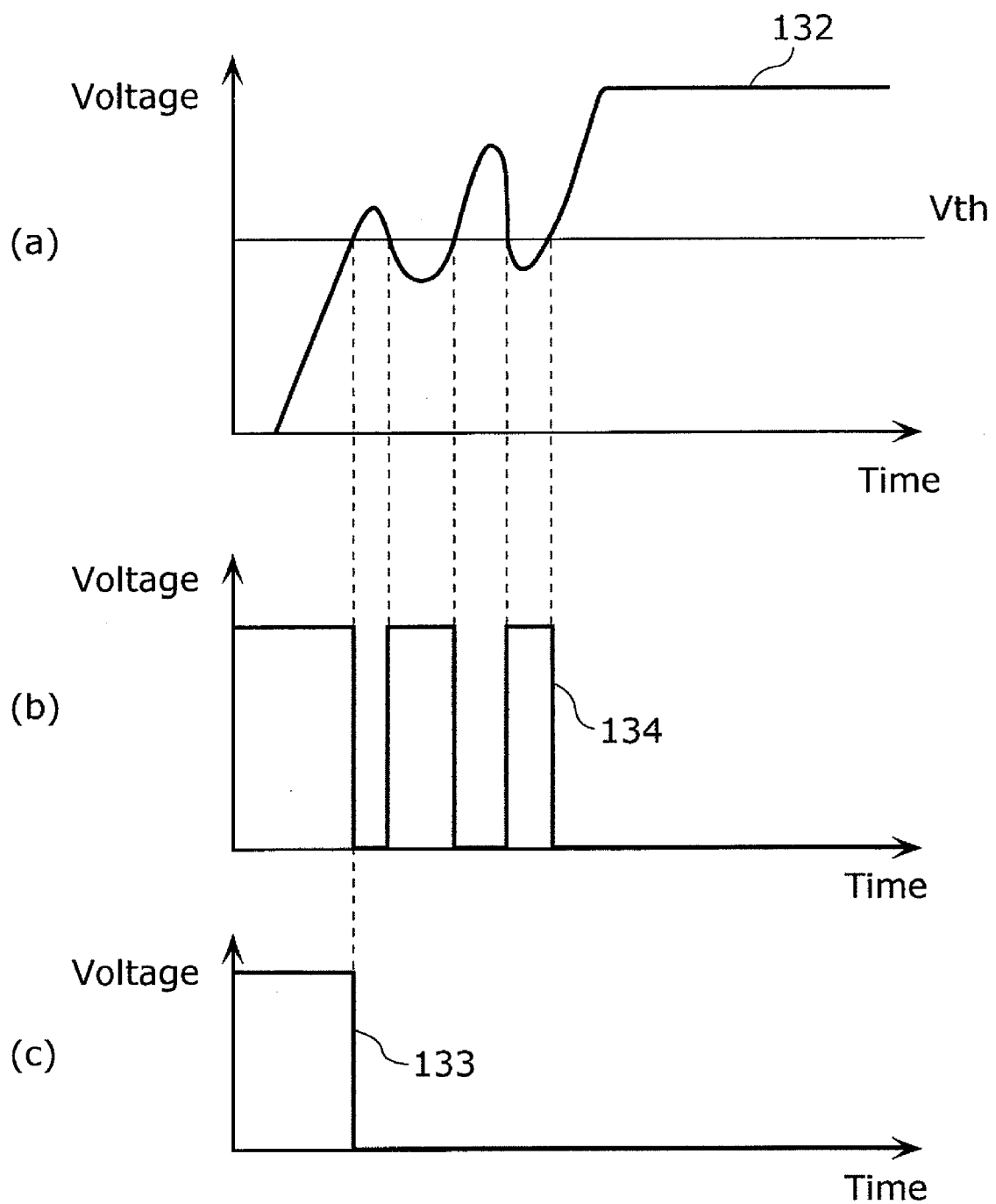
FIG. 6 shows an example of an output signal and a power down signal of the comparator in the first embodiment of the present invention.

FIG. 6 shows the output signal 132 and the power-down signal 133 when the output signal 132 changes. FIG. 6 (a) shows the output signal 132. FIG. 6 (b) is a diagram showing, for comparison, the power-down signal 134 when flip-flop 122 is not used. FIG. 6 (c) shows the power-down signal 133 in the AD converting unit 103 in the first embodiment of the present invention.

As shown in FIG. 6 (a), the output signal 132 swings when changing. As shown in FIG. 6 (b), the swing causes the change of the power-down signal 134 based on logical threshold values Vth of the buffer 121 and the flip-flop 122. Thus, the power-down signal 134 cannot be controlled. This destabilizes the operations of the counter 111 and the comparator 109 into which the power-down signal 134 is inputted.

Meanwhile, as shown in FIG. 6 (c), use of flip-flop 122: changes the power-down signal 133 at the first moment that the output signal 132 exceeds the logical threshold value Vth; and holds the logic of the power-down signal 133 regardless of the swing caused by the output signal 132 after the change.

Thus, the AD converting unit 103 in the first embodiment of the present invention can avoid the effect of the swing caused by the output signal 132.

Second Embodiment

In a second embodiment of the present invention, a structural modification example shall be described with regard to the power-down controlling unit 110 of the solid-state imaging device 100 in the first embodiment.

First, a structure of a solid-state imaging device in the second embodiment shall be described.

The structure of the solid-state imaging device 100 in the second embodiment is similar to the structure of the solid-state imaging device 100 in the first embodiment in FIG. 2, and thus, the description shall be omitted.

Figure 7:
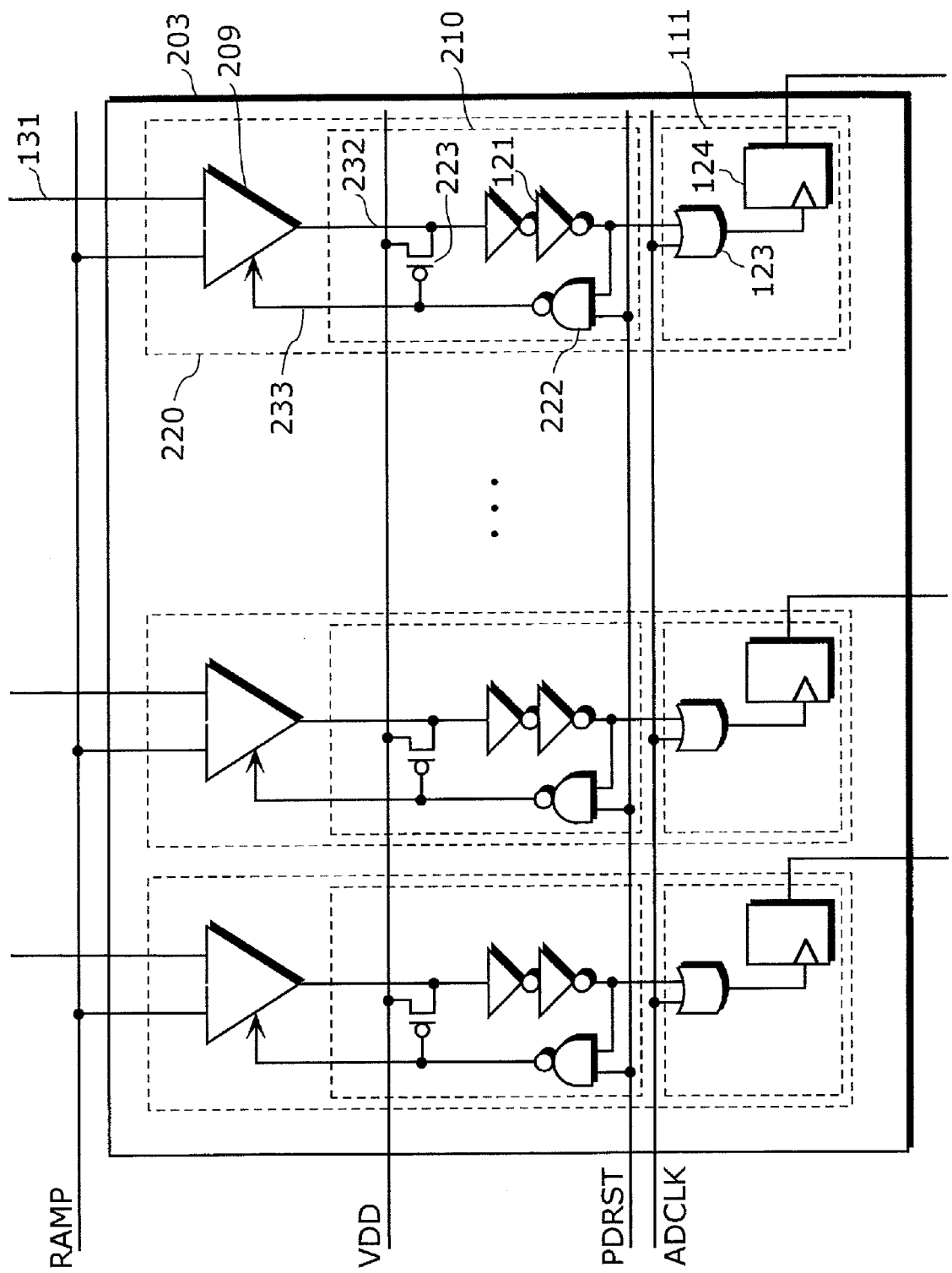
FIG. 7 shows a structure of an AD converting unit in a second embodiment of the present invention.

FIG. 7 shows a structure of an AD converting unit 203 included in the solid-state imaging device 100 in the second embodiment of the present invention. It is noted that, in FIG. 7, the same elements as the elements in FIG. 3 share the same numerical references, and thus detailed descriptions of the elements in FIG. 7 shall be omitted.

The AD converting unit 203 includes AD converting circuits 220 provided on each of column signal lines. Each of the AD converting circuits 220 includes a comparator 209, a power-down controlling unit 210, and a counter 111.

The comparator 209 compares the signal voltage 131 provided to the column signal line and the reference voltage RAMP, and then outputs an output signal 232 showing the bigger voltage, either the signal voltage 131 or the reference voltage RAMP. Other than putting an output into a high-impedance state in a suspension state, operations of the comparator 209 are similar to the operations of the comparator 109 in the first embodiment.

The power-down controlling unit 210 changes a power-down signal 233 into a low-level upon logic of an output signal 232 inverting from the low-level to a high-level.

The power-down controlling unit 210 includes the buffer 121, an NAND circuit 222, and a transistor 223.

The buffer 121 converts the output signal 232, having amplitude of analogue circuit-based power supply voltage, into a signal having amplitude of digital circuit-based power supply voltage, and then forwards the signal to the NAND circuit 222, and the OR circuit 123.

A reset signal PDRST and the signal provided from the buffer 121 are respectively provided to two input terminals of the NAND circuit 222 as inputs. The NAND circuit 222 generates the power-down signal 233. The reset signal PDRST is, for example, generated by the timing controlling unit 107.

The transistor 223 is a type-P MOS transistor. The transistor 223 receives: the power-down signal 233 into a gate as an input; and power supply voltage VDD into a source. Further, a drain of the transistor 223 is connected to an output terminal of the comparator 209. The transistor 223 fixes the output signal 232 to the high-level after the output signal 232 inverts from the low-level to the high-level.

Next, an operation of the solid-state imaging device 100 in the second embodiment of the present invention shall be described.

Figure 8:
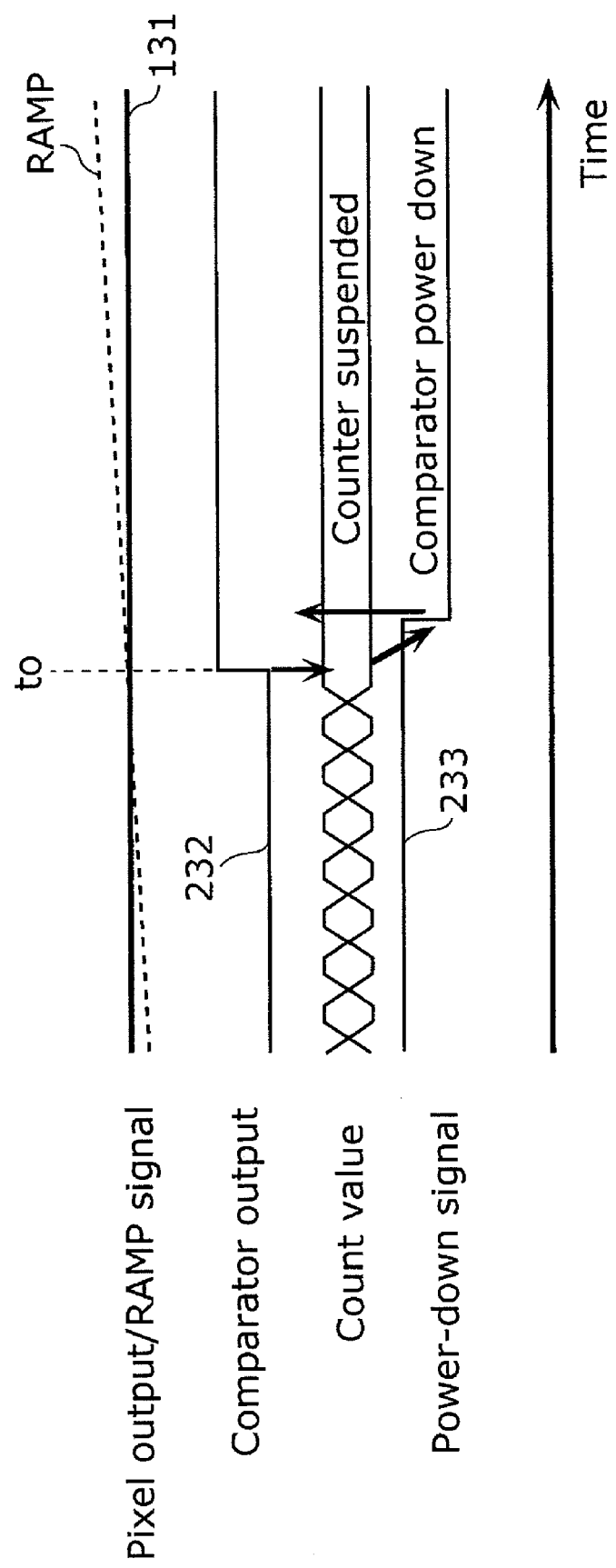
FIG. 8 shows an operation of the AD converting unit in the second embodiment of the present invention.
Figure 9:
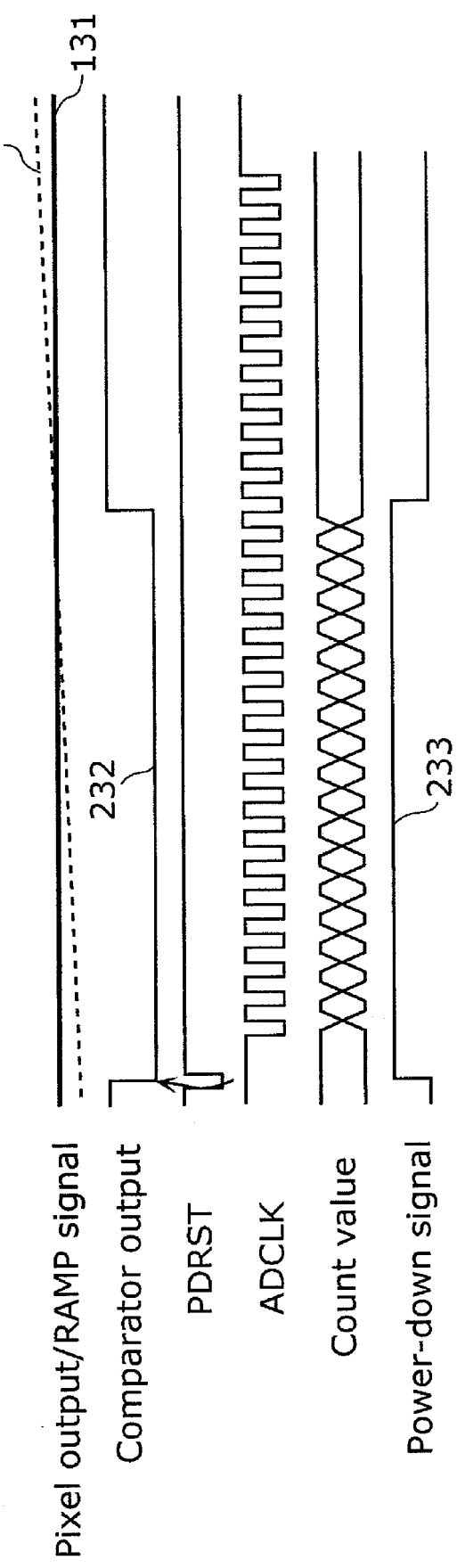
FIG. 9 shows an operation of the AD converting unit in the second embodiment of the present invention.

FIGS. 8 and 9 show AD converting operations on the AD converting unit 203. It is noted that description of similar AD converting operations of the AD converting unit 203 to the AD converting operation of the AD converting unit 103 are omitted, and thus, only differences of operations between the AD converting unit 103 and the AD converting unit 203 shall be described.

First, when starting the AD converting operations, the reset signal PDRST temporarily becomes active (low-level), and the power-down signal 233 goes into the high-level. This causes the comparator 209 to go into an active state, and the comparator 209 generates a low-level output signal 232. Further, the counter circuit 124 counts a count value.

The signal voltage 131 and the reference voltage RAMP meet at the time t0. This changes the output signal 232 from the comparator 209 from the low-level to the high-level.

This causes the power-down signal 233 to go into the low-level, and the counter circuit 124 holds the count value at the time t0.

Meanwhile, the comparator 209: goes into a suspension state; and puts the output into the high-impedance state. Further, turning the transistor 223 on causes the output signal 232 to stay in the high-level.

As described above, the AD converting unit 203 in the second embodiment of the present invention, as well as the AD converting unit 103 in the first embodiment, sequentially causes the AD converting circuits 220, of which AD conversion has completed, to go into the suspension state. This reduces the consumption current of the AD converting unit 203. Thus, the solid-state imaging device 100 in the second embodiment of the present invention can reduce power consumption.

It is noted that approximately 20 transistors are included in the power-down controlling unit 110 of the AD converting unit 103 in the first embodiment; meanwhile, just as many as five transistors are included in the power-down controlling unit 210 of the AD converting unit 203 in the second embodiment. This reduces the circuit area of the AD converting unit 203 in the second embodiment.

Here, the number of flip-flops which the counter circuit 124 has is determined based on the AD conversion accuracy. Typical conversion accuracy of the counter circuit 124 is approximately a dozen bits. In this case, the circuit area of the AD converting unit 203 can be decreased by as large as five percent by using the AD converting unit 203 in the second embodiment, compared with the case where the AD converting unit 103 in the first embodiment is used.

Moreover, a smaller pixel cell size increases the area, of the solid-state imaging device 100, which the AD converting unit 203 occupies. This further increases the effect of the decreased circuit area. In other words, the AD converting unit 203 in the second embodiment achieves a greater effect in response to higher picture quality which the solid-state imaging device 100 achieves.

Third Embodiment

A solid-state imaging device in a third embodiment of the present invention includes a first mode and a second mode. The first mode sequentially causes comparators, of which AD conversion has completed, to go into a suspension state. The second mode simultaneously stops power supply to the comparators upon passing an AD conversion period.

First, a structure of the solid-state imaging device in the third embodiment shall be described.

The structure of the solid-state imaging device 100 in the third embodiment is similar to the structure in FIG. 2, and thus, the description shall be omitted.

Figure 10:
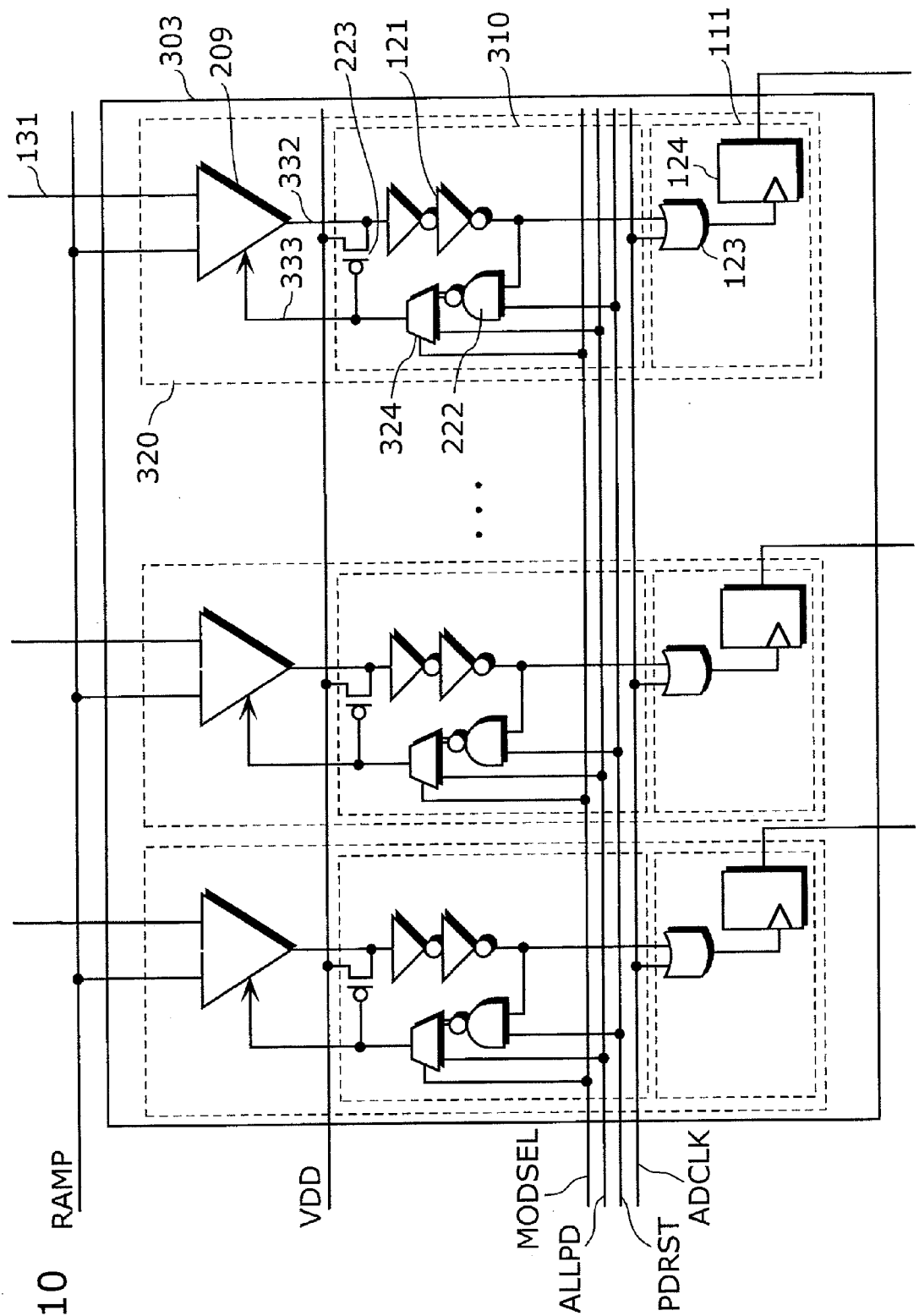
FIG. 10 shows a structure of an AD converting unit in a third embodiment of the present invention.

FIG. 10 shows a structure of an AD converting unit 303 included in the solid-state imaging device 100 in the third embodiment of the present invention. It is noted, in FIG. 10, that the same elements as the elements in FIG. 7 share the same numerical references, and thus detailed descriptions of the elements in FIG. 10 shall be omitted.

The AD converting unit 303 includes AD converting circuits 320 provided on each of column signal lines. Each of the AD converting circuits 320 includes the comparator 209, the power-down controlling unit 310, and the counter 111.

A power-down controlling unit 310 can be switched between the first mode and the second mode in response to a mode selecting signal MODSEL. The first mode sequentially causes the comparators 209, of which AD conversion has completed, to go into the suspension state. The second mode simultaneously stops power supply to the comparators 209.

In addition to the structural elements of the AD converting circuit 220 in the second embodiment, the AD converting circuit 320 additionally includes a selector 324.

In the case where the mode selecting signal MODSEL is in a low-level, the selector 324 selects an all power-down signal ALLPD, and then forwards the selected all power-down signal ALLPD as a power-down signal 333. In the case where the mode selecting signal MODSEL is in a high-level, meanwhile, the selector 324 selects a signal provided from the NAND circuit 222, and then forwards the selected signal as the power-down signal 333. In other words, the selector 324 switches between the first mode and the second mode in response to the mode selecting signal MODSEL.

The all power-down signal ALLPD is generated by the timing controlling unit 107. The mode selecting signal MODSEL is generated by the timing controlling unit 107 based on a mode selection operation by the user.

Next, operations of the solid-state imaging device 100 in the third embodiment of the present invention shall be described.

Figure 11:
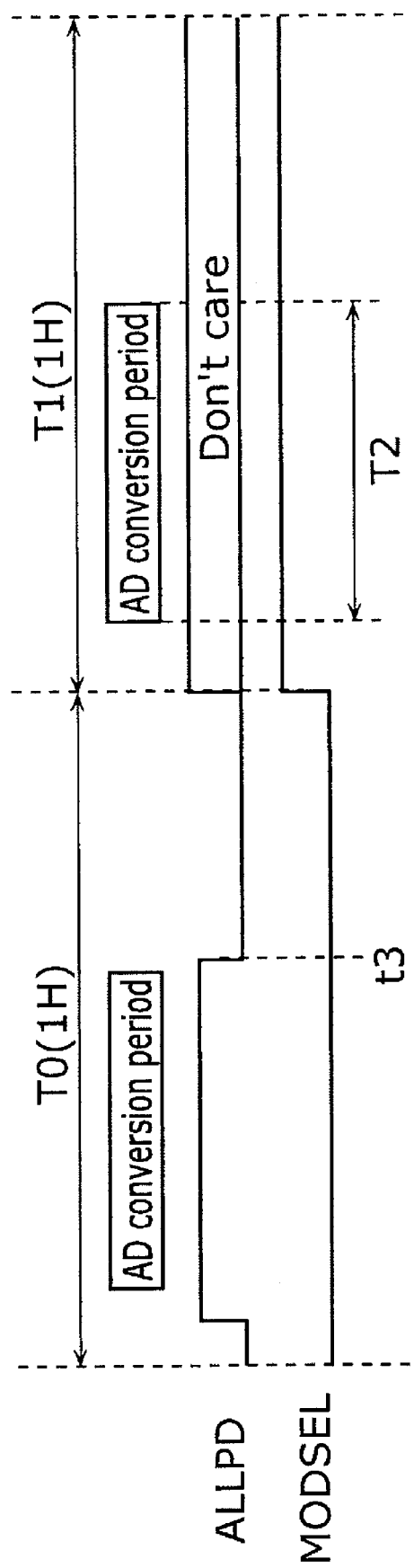
FIG. 11 shows an operation of the AD converting unit in the third embodiment of the present invention.

FIG. 11 shows AD converting operations on the AD converting unit 303. It is noted that similar AD converting operations of the AD converting unit 303 to the AD converting operations of the AD converting unit 203 are omitted, and thus, only differences shall be described.

In a period T0, in which the mode selecting signal MODSEL is in the low-level, the all power-down signal ALLPD changes from the low-level to the high-level before an AD conversion period starts. Upon ending the AD conversion period, the all power-down signal ALLPD changes from the high-level to the low-level.

Since the mode selecting signal MODSEL is in the low-level, each of power-down controlling units 310 supplies the all power-down signal ALLPD to the associated comparator 209 as the power-down signal 333. This simultaneously causes all the comparators 209 to go into the suspension state at a time t3 after the AD conversion period ends.

Here, an ending time of the AD conversion period is the time at which the AD converting operations by all the AD converting circuit 320 end. In other words, after inverting logics of output signals 332, the power-down controlling units 310 suspends power supply to the corresponding comparators 209.

During a period T1 in which the mode selecting signal MODSEL is in the high-level, the AD converting unit 303 performs similar operations to the operations on the AD converting unit 203 in the above described second embodiment. In other words, the power-down controlling unit 310 sequentially causes the AD converting circuits 320, of which AD conversion has completed, to go into the suspension state during an AD conversion period T2.

It is noted that each of the periods T0 and T1 shown in FIG. 11 is as long as a single row scanning period (a period to read signals for one line) in length. Further, single row scanning periods for the respective first and second modes may be different in length.

As described the above, the solid-state imaging device 100 in the third embodiment of the present invention can selectively utilize the first mode and the second mode. The first mode sequentially causes the comparators 209, of which AD conversion has completed, to go into the suspension state. The second mode simultaneously stops power supply to the comparators 209.

Here, in the case where the AD converting circuits 320, of which AD conversion has completed, sequentially go into the suspension state, high impedance on power supply and a GND line is assumed to causes a slight fluctuation of power supply voltage and ground potential during the AD conversion. This possibly causes degradation of picture quality.

Hence, when low power consumption is prioritized, the first mode is used, and when high picture quality is prioritized, the second mode is used. Thus, a more appropriate mode can be used based on usage of the solid-state imaging device 100 in the third embodiment of the present invention Further, the first mode may be a moving picture mode to record a moving picture, and the second mode may be a still mode to record a still picture.

The above has described the solid-state imaging device in the embodiments of the present invention; meanwhile, the present invention shall not be limited to the embodiments.

In the above third embodiment, for example, the first mode and the second mode can be switched therebetween. In the meantime, the third embodiment may implement only the second mode simultaneously suspending power supply to the comparators 209. This can also reduce power consumption of the solid-state imaging device 100 since the power supply to the comparators 209 is suspended upon ending the AD converting operation.

Figure 12:
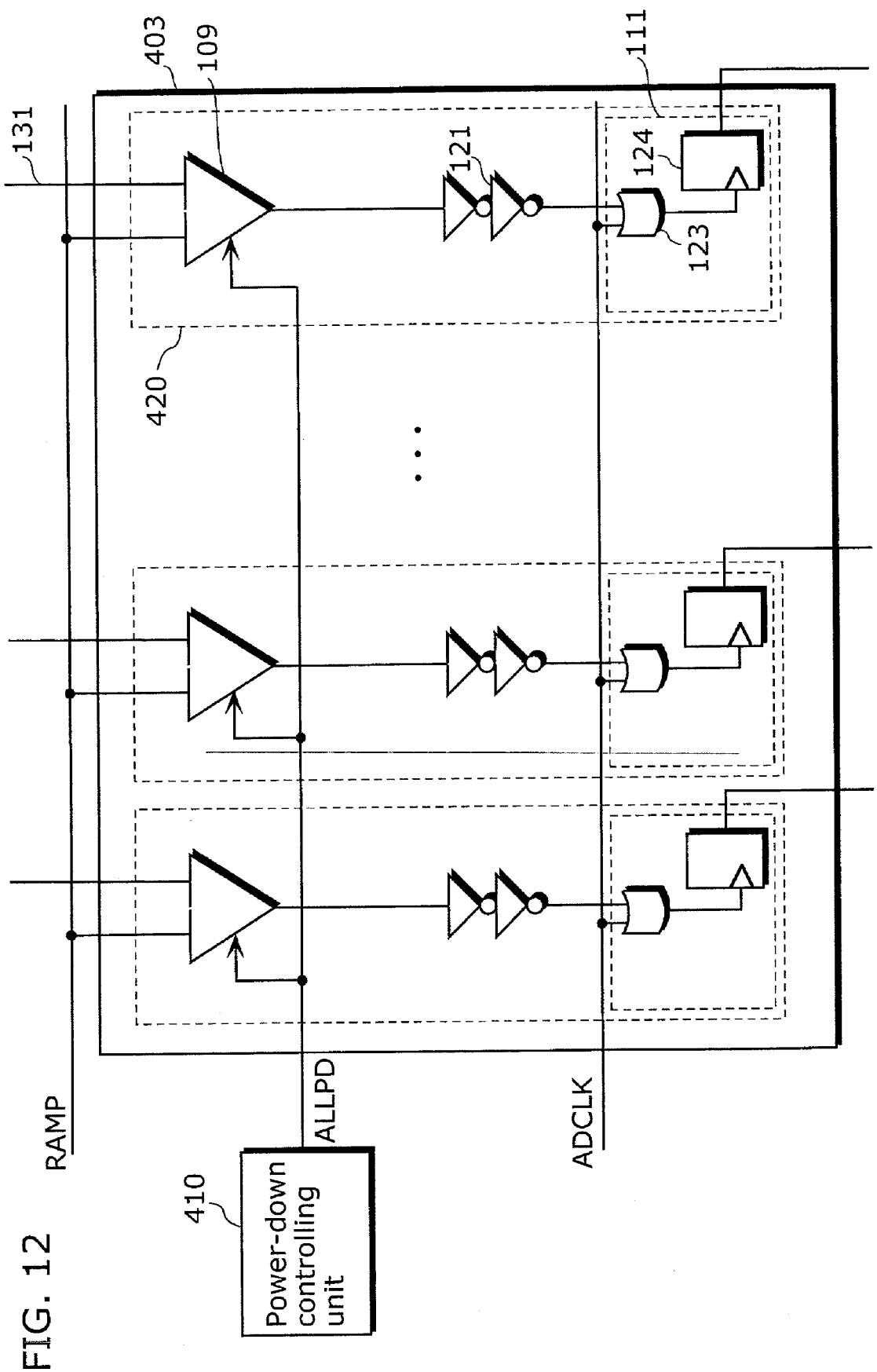
FIG. 12 shows a structure of a modification example of the AD converting unit in the third embodiment of the present invention.

FIG. 12 is a modification example of the third embodiment showing a structure of an AD converting unit 403. The AD converting unit 403 only functions to simultaneously suspend power supply to the comparators 109.

As shown in FIG. 12, all the comparators 109 may simultaneously be suspended with the all power-down signal ALLPD generated by a power-down controlling unit 410.

In the above embodiments the structures of the AD converting units 103, 203, and 303 have been described; meanwhile, the present invention shall not be limited to the structures as far as a structure can implement similar functions. For example, all or part of signal logic may be inverted, so that the structure of the circuit can be modified accordingly.

Further, in the above second embodiment, the power-down controlling unit 210 includes the transistor 223; meanwhile, the power-down controlling unit 210, without the transistor 223, and, in the suspension state, the comparator 209 may output the high-level output signal 232. Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to solid-state imaging devices, and more particularly, to a solid-state imaging device including an AD converting circuit for each of columns. In addition, the present invention can be applied to digital still cameras and digital video cameras including solid-state imaging devices.

What is claimed is:

1. A solid-state imaging device, comprising:
pixels, arranged in a matrix, each of which converts light into a signal voltage;
column signal lines each of which is provided for a corresponding one of columns on which said pixels are arranged, so that the signal voltage generated by a said pixel is provided to a corresponding one of said column signal lines; and
AD converters, each of which is provided for a corresponding one of said column signal lines, and configured to convert the signal voltage into a digital signal,
wherein each of said AD converters includes:
a comparator configured to generate an output signal indicating a greater voltage of the signal voltage and a reference voltage; and
a counter configured to count a count value to measure an elapsed time until logic of the output signal is inverted, and
said solid-state imaging device further comprises:
a suspender configured to receive the output signal generated by said comparator and suspend a power supply to said comparator according to the logic of the output signal.

2. The solid-state imaging device according to claim 1, wherein said suspender is configured to simultaneously suspend the power supply to all comparators according to logic of an all power down signal.

3. The solid-state imaging device according to claim 1, wherein said suspender is configured to suspend the power supply to each said comparator upon inversion of the logic of the output signal generated by said comparator.

4. The solid-state imaging device according to claim 1, wherein the suspender outputs a power-down signal to the comparator.

5. The solid-state imaging device according to claim 2, wherein said suspender includes a switch configured to switch between a first suspending operation and a second suspending operation, the first suspending operation suspending the power supply to each said comparator upon the inversion of the logic of the output signal generated by said comparator, and the second suspending operation simultaneously suspending the power supply to all comparators after the predetermined time elapses since said counter starts counting.

6. The solid-state imaging device according to claim 3, wherein said suspender includes flip-flops which are provided for each corresponding AD converter, and each of which has a clock input terminal and a data input terminal, the clock input terminal receiving the output signal generated by said comparator, and the data input terminal receiving a signal having predetermined logic, and
said suspender is configured to suspend the power supply to each said comparator upon inversion of logic of a signal provided to a data output terminal of said each of flip-flops, and
said counter is configured to count a time for the logic of the signal to invert, the signal being provided to the data output terminal of said each of flip-flops.

7. The solid-state imaging device according to claim 3, wherein said suspender includes transistors which are provided for each corresponding AD converter, and each of which is configured to fix the output signal, generated by said comparator, to logic shown as a result of the inversion of the logic of the output signal.

8. The solid-state imaging according to claim 7, wherein said suspender further includes inverters which are provided for each corresponding AD converter, and each of which is configured to invert the logic of the output signal generated by said comparator, and
each of said transistors receives: the signal of which logic is inverted by an inverter into a gate; a signal having logic as the result of inverting the logic of the output signal into a source, and a drain in said transistor is connected to an output terminal of said comparator.

9. A controlling method for a solid-state imaging device: which includes:
pixels, arranged in a matrix, each of which converts light into a signal voltage;
column signal lines, each of which is provided for corresponding one of columns on which the pixels are arranged, so that the signal voltage generated by each pixel is provided to corresponding one of the column signal lines; and AD converters, each of which is provided for a corresponding one of the column signal lines, and configured to convert the signal voltage into a digital signal, wherein each of the AD converters includes:

a comparator configured to generate an output signal indicating a greater voltage of the signal voltage and a reference voltage; and a counter configured to count a count value to measure an elapsed time until logic of the output signal is inverted; and a suspender configured to receive the output signal generated by said comparator, said controlling method comprises:

suspending a power supply to each comparator according to the logic of each corresponding output signal.

* * * * *